US011942735B2

(12) United States Patent
Paynter

(10) Patent No.: US 11,942,735 B2
(45) **Date of Patent: *Mar. 26, 2024**

(54) GANGED COAXIAL CONNECTOR ASSEMBLY

(71) Applicant: CommScope Technologies LLC, Hickory, NC (US)

(72) Inventor: Jeffrey D. Paynter, Momence, IL (US)

(73) Assignee: COMMSCOPE TECHNOLOGIES LLC, Hickory, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/817,130

(22) Filed: Aug. 3, 2022

(65) Prior Publication Data

US 2022/0376446 A1 Nov. 24, 2022

Related U.S. Application Data

(63) Continuation of application No. 17/088,309, filed on Nov. 3, 2020, now Pat. No. 11,424,582.

(Continued)

(51) Int. Cl.

*H01R 9/05* (2006.01)
*H01R 13/518* (2006.01)

(Continued)

(52) U.S. Cl.

CPC ............... *H01R 24/40* (2013.01); *H01R 9/05* (2013.01); *H01R 13/518* (2013.01); *H01R 25/003* (2013.01); *H01R 2107/00* (2013.01)

(58) Field of Classification Search

CPC ........ H01R 9/05; H01R 13/518; H01R 24/40; H01R 25/003; H01R 2107/00

(Continued)

(56) References Cited

U.S. PATENT DOCUMENTS

| | | | | |
|---|---|---|---|---|
| 5,098,315 A * | 3/1992 | Scowen | ............. | H01R 13/4367 439/589 |
| 6,422,903 B1 * | 7/2002 | Fekonja | ............... | H01R 13/506 439/314 |

(Continued)

FOREIGN PATENT DOCUMENTS

| | | |
|---|---|---|
| EP | 2816672 A1 | 12/2014 |
| KR | 20190056512 A | 5/2019 |

OTHER PUBLICATIONS

"International Preliminary Report on Patentability corresponding to International Application No. PCT/US2020/059054 dated Jun. 2, 2022".

(Continued)

*Primary Examiner* — Abdullah A Riyami
*Assistant Examiner* — Vladimir Imas
(74) *Attorney, Agent, or Firm* — Myers Bigel, P.A.

(57) ABSTRACT

A ganged connector assembly includes: first, second, third and fourth coaxial cables; first, second, third and fourth coaxial connectors, each of the coaxial connectors connected with a corresponding one of the coaxial cables; a shell surrounding the coaxial connectors, the shell configured to electrically isolate each of the coaxial connectors from the other coaxial connectors, wherein the coaxial connectors are arranged in a generally square pattern; and a strain relief boot comprising: first and second cover pieces that are assembled to create a cover around portions of the coaxial cables and the coaxial connectors; and first and second braces that reside within the cover, the first brace being positioned between first and second of the coaxial connectors, and the second brace being positioned between third and fourth of the coaxial connectors.

15 Claims, 7 Drawing Sheets

Related U.S. Application Data

(60) Provisional application No. 62/938,455, filed on Nov. 21, 2019.

(51) Int. Cl.
*H01R 24/40* (2011.01)
*H01R 25/00* (2006.01)
*H01R 107/00* (2006.01)

(58) Field of Classification Search
USPC ........................................................ 439/578
See application file for complete search history.

(56) References Cited

U.S. PATENT DOCUMENTS

| | | | | |
|---|---|---|---|---|
| 7,347,745 | B1 * | 3/2008 | Raudenbush .......... | H01R 24/40 439/752 |
| 7,771,242 | B2 * | 8/2010 | Xue ....................... | H01R 13/42 439/682 |
| 8,974,241 | B2 * | 3/2015 | Finona ............... | H01R 13/5208 439/271 |
| 9,472,883 | B2 * | 10/2016 | Honnige ................ | H01R 13/42 |
| 10,038,278 | B2 * | 7/2018 | Lane .................. | H01R 13/6272 |
| 10,461,463 | B2 * | 10/2019 | Schoenfeld .......... | H01R 13/518 |
| 10,608,392 | B2 * | 3/2020 | Duan ................. | H01R 13/6588 |
| 10,931,070 | B1 * | 2/2021 | Files ...................... | H01R 24/40 |
| 10,950,970 | B2 * | 3/2021 | Paynter ................ | H01R 13/518 |
| 10,978,840 | B2 * | 4/2021 | Paynter .............. | H01R 13/6315 |
| 11,424,582 | B2 * | 8/2022 | Paynter ................ | H01R 9/0506 |
| 2008/0142261 | A1 | 6/2008 | Pini | |
| 2013/0303021 | A1 * | 11/2013 | Vackar ................... | H01R 24/50 29/593 |
| 2019/0237901 | A1 | 8/2019 | Schoenfeld et al. | |
| 2019/0312394 | A1 * | 10/2019 | Paynter ................ | H01R 13/518 |
| 2019/0363481 | A1 | 11/2019 | Paynter et al. | |
| 2021/0159647 | A1 * | 5/2021 | Paynter ................ | H01R 13/518 |
| 2021/0210901 | A1 * | 7/2021 | Zhou .................. | H01R 13/6275 |
| 2022/0376446 | A1 * | 11/2022 | Paynter .............. | H01R 13/5825 |

OTHER PUBLICATIONS

"International Search Report and Written Opinion corresponding to International Application No. PCT/US2020/059054 dated Feb. 26, 2021".

Extended European Search Report corresponding to EP 20890573.7; dated Nov. 8, 2023 (8 pages).

* cited by examiner

GANGED COAXIAL CONNECTOR ASSEMBLY

RELATED APPLICATION

This application is a continuation of and claims priority to U.S. patent application Ser. No. 17/088,309, filed Nov. 3, 2020, which claims priority from and the benefit of U.S. Provisional Patent Application No. 62/938,455, filed Nov. 21, 2019, the disclosure of which is hereby incorporated herein in its entirety.

FIELD OF THE INVENTION

The present invention relates generally to electrical cable connectors and, more particularly, to ganged connector assemblies.

BACKGROUND OF THE INVENTION

Coaxial cables are commonly utilized in RF communications systems. Coaxial cable connectors may be applied to terminate coaxial cables, for example, in communication systems requiring a high level of precision and reliability.

Connector interfaces provide a connect/disconnect functionality between a cable terminated with a connector bearing the desired connector interface and a corresponding connector with a mating connector interface mounted on an apparatus or a further cable. Some coaxial connector interfaces utilize a retainer (often provided as a threaded coupling nut) that draws the connector interface pair into secure electro-mechanical engagement as the coupling nut, rotatably retained upon one connector, is threaded upon the other connector.

Alternatively, connection interfaces may be also provided with a blind mate characteristic to enable push-on interconnection, wherein physical access to the connector bodies is restricted and/or the interconnected portions are linked in a manner where precise alignment is difficult or not cost-effective (such as the connection between an antenna and a transceiver that are coupled together via a rail system or the like). To accommodate misalignment, a blind mate connector may be provided with lateral and/or longitudinal spring action to accommodate a limited degree of insertion misalignment. Blind mated connectors may be particularly suitable for use in "ganged" connector arrangements, in which multiple connectors (for example, four connectors) are attached to each other and are mated to mating connectors simultaneously.

Due to the limited space on devices such as antennas or radios and the increasing port count required therefor, there may be a need for an interface that increases the density of port spacing and decreases the labor and skill required to make many connections repeatedly. One such interface is embodied in connectors illustrated and described in U.S. Patent Publication Nos. 2019/0312394 and 2019/0363481, the disclosures of which are hereby incorporated herein by reference in full.

SUMMARY

As a first aspect, embodiments of the invention are directed to a ganged connector assembly comprising: first, second, third and fourth coaxial cables; first, second, third and fourth coaxial connectors, each of the coaxial connectors connected with a corresponding one of the coaxial cables; a shell surrounding the coaxial connectors, the shell configured to electrically isolate each of the coaxial connectors from the other coaxial connectors, wherein the coaxial connectors are arranged in a generally square pattern; and a strain relief boot. The strain relief boot comprises: first and second cover pieces that are assembled to create a cover around portions of the coaxial cables and the coaxial connectors; and first and second braces that reside within the cover, the first brace being positioned between first and second of the coaxial connectors, and the second brace being positioned between third and fourth of the coaxial connectors.

As a second aspect, embodiments of the invention are directed to ganged connector assembly comprising: first, second, third, fourth and fifth coaxial cables; first, second, third, fourth and fifth coaxial connectors, each of the coaxial connectors connected with a respective coaxial cable; a shell surrounding the coaxial connectors, the shell configured to electrically isolate each of the coaxial connectors from the other coaxial connectors, wherein the coaxial connectors are arranged in a generally cruciform pattern, wherein the fifth coaxial connector is positioned in the center of the pattern; and a strain relief boot. The strain relief boot comprises: first and second cover pieces that are assembled to create a cover around portions of the coaxial cables and the coaxial connectors; and first and second braces that reside within the cover, the first brace being positioned between adjacent the fifth coaxial connector and between the first and second coaxial connectors, and the second brace being positioned adjacent the fifth coaxial connector opposite the first brace and between the third and fourth coaxial connectors.

As a third aspect, embodiments of the invention are directed to a method of assembling a strain relief boot on a ganged connector assembly. The method comprises:

providing a ganged connector assembly comprising:

first, second, third and fourth coaxial cables;

first, second, third and fourth coaxial connectors, each of the coaxial connectors connected with a respective one of the coaxial cables; and a shell surrounding the coaxial connectors, the shell configured to electrically isolate each of the coaxial connectors from the other coaxial connectors, wherein the coaxial connectors are arranged in a generally square pattern;

inserting a first brace between the first and second coaxial connectors;

inserting a second brace between the third and fourth coaxial connectors; and assembling a cover from first and second cover pieces, the first cover piece engaging the first and second braces and the first and fourth coaxial connectors, and the second cover piece engaging the first and second braces and the second and third coaxial connectors.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms “a”, “an” and “the” are intended to include the plural forms as well, unless the context clearly indicates otherwise. It will also be understood that when an element (e.g., a device, circuit, etc.) is referred to as being “connected” or “coupled” to another element, it can be directly connected or coupled to the other element or intervening elements may be present. In contrast, when an element is referred to as being “directly connected” or “directly coupled” to another element, there are no intervening elements present.

Figure 1:
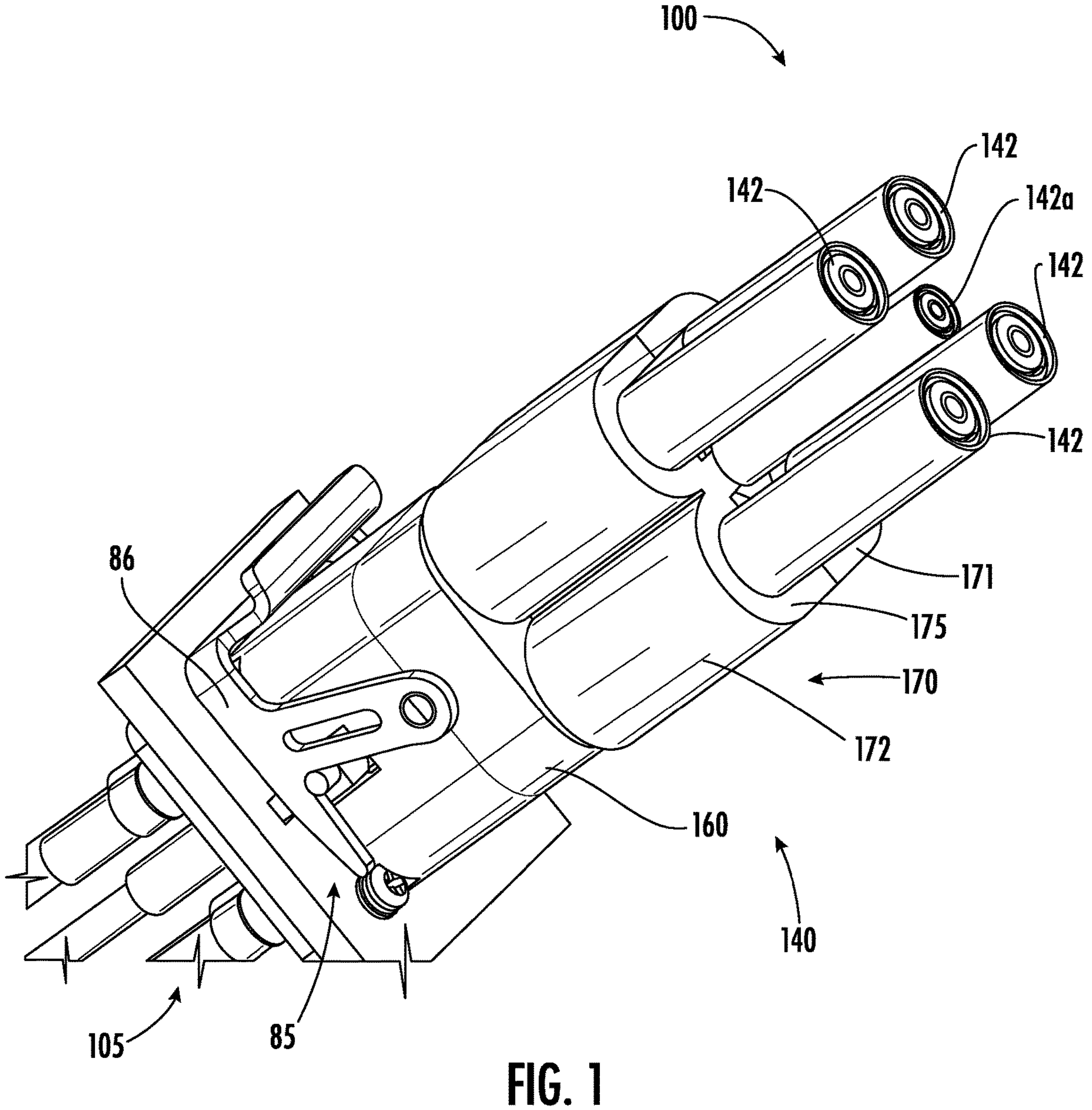
FIG. 1 is a perspective view of a ganged coaxial connector assembly according to embodiments of the invention.
Figure 2:
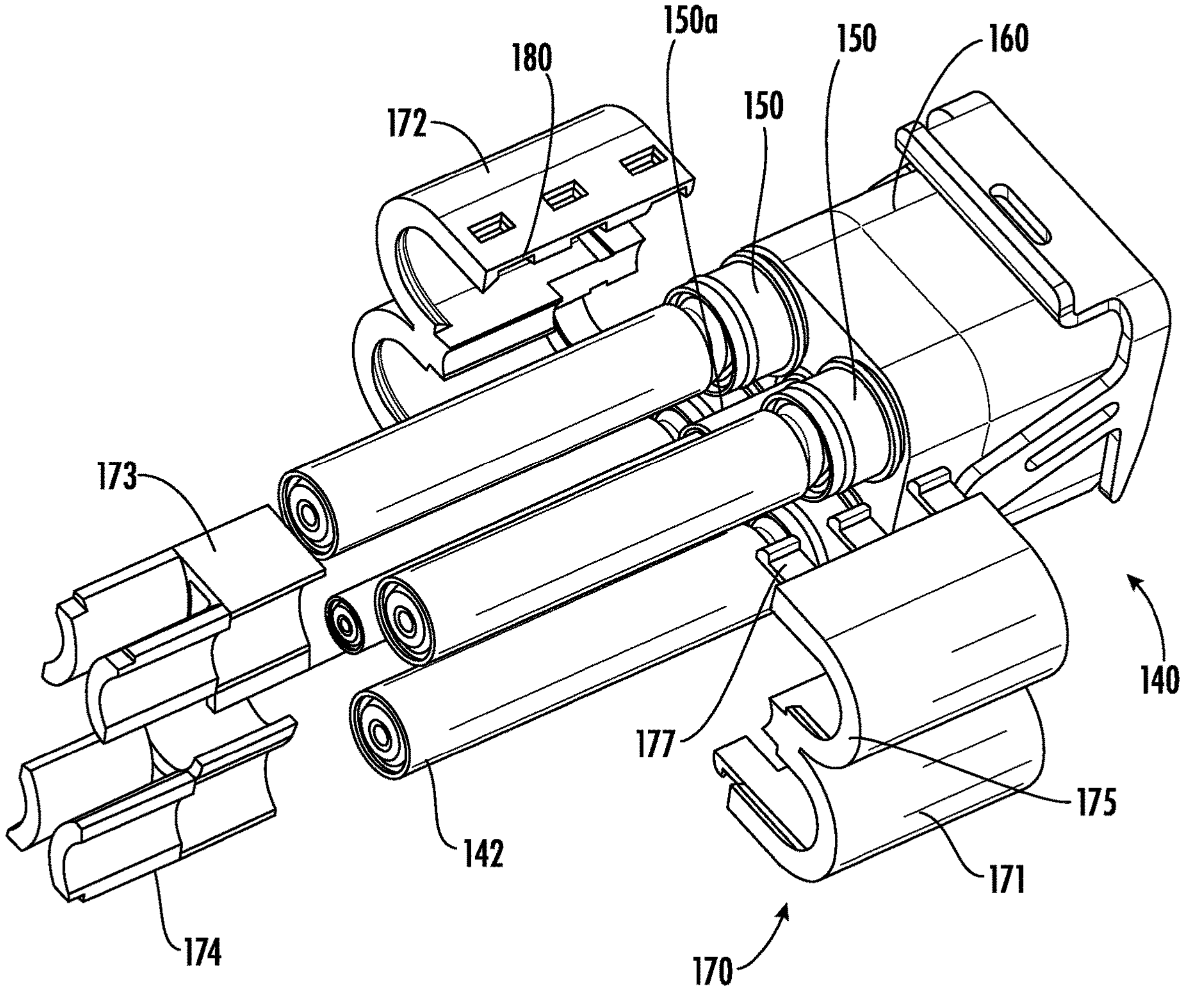
FIG. 2 is an exploded view of the assembly of FIG. 1.

Referring now to the drawings, an assembly of ganged connectors, designated broadly at 100, is shown in FIG. 1. The assembly 100 comprises an equipment connector assembly 105 having five connectors (not shown in FIG. 1—see FIGS. 2 and 9) mating with a cable connector assembly 140 having five connectors 150 contained within a shell 160. As shown in FIG. 1, the equipment connector assembly 105 is maintained in a mating configuration with the cable connector assembly 140 via a toggle assembly 85 that includes a latch 86. The shell 160, connectors 150 and toggle assembly 85 are discussed in detail in U.S. Patent Publication No. 2019/0363481, supra, and need not be discussed in detail herein.

The cable connector assembly 140 includes five cables in a cruciform arrangement, four of which (designated at 142) are of a larger size (e.g., a ⅜ inch cable) than a fifth cable **142*a* (e.g., a ¼ inch cable). The cable 142*a* is located at the center or intersection of the “cross” formed by the cables 142, 142*a*. The five connectors 150 are also arranged in a cruciform arrangement: four of the connectors (designated 150) are attached to the larger cables 142, and one of the connectors (designated 150*a*) is shorter in overall length and is attached to the smaller cable 142*a*. The smaller cable 142*a* and smaller connector 150*a*** may be employed in the center port position, and is typically used for calibration purposes.

The cable connector assembly 140 includes a multi-piece strain relief boot 170. As shown in FIGS. 2-12, the strain relief boot 170 includes two cover pieces 171, 172 and two inner braces 173, 174. These are described in greater detail below.

Figure 5:
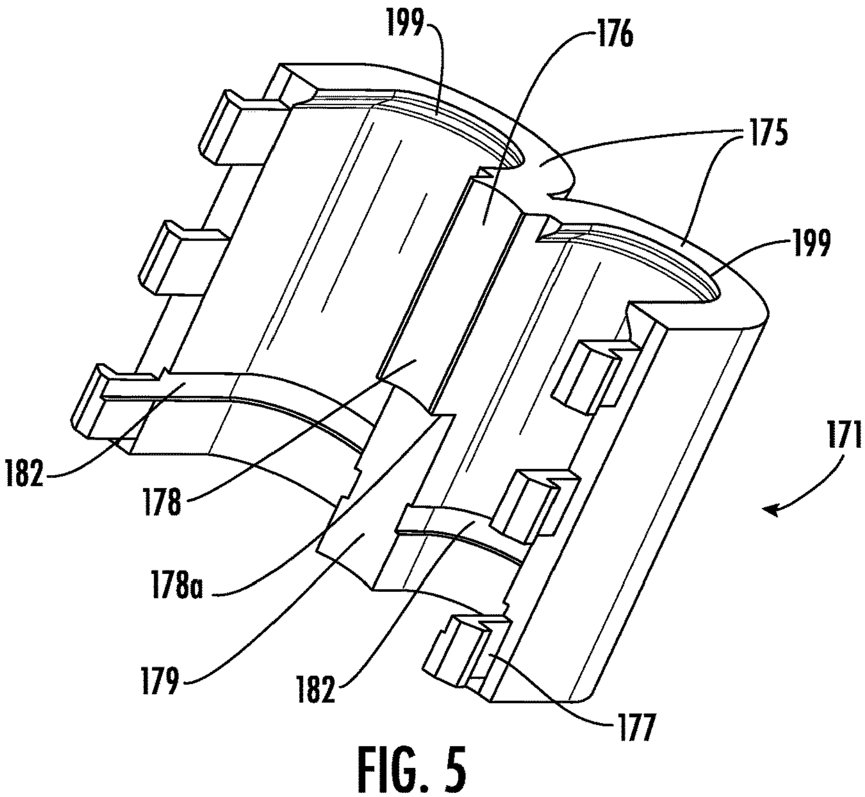
FIG. 5 is a perspective view of a cover piece of the strain relief boot of the assembly of FIG. 1.
Figure 6:
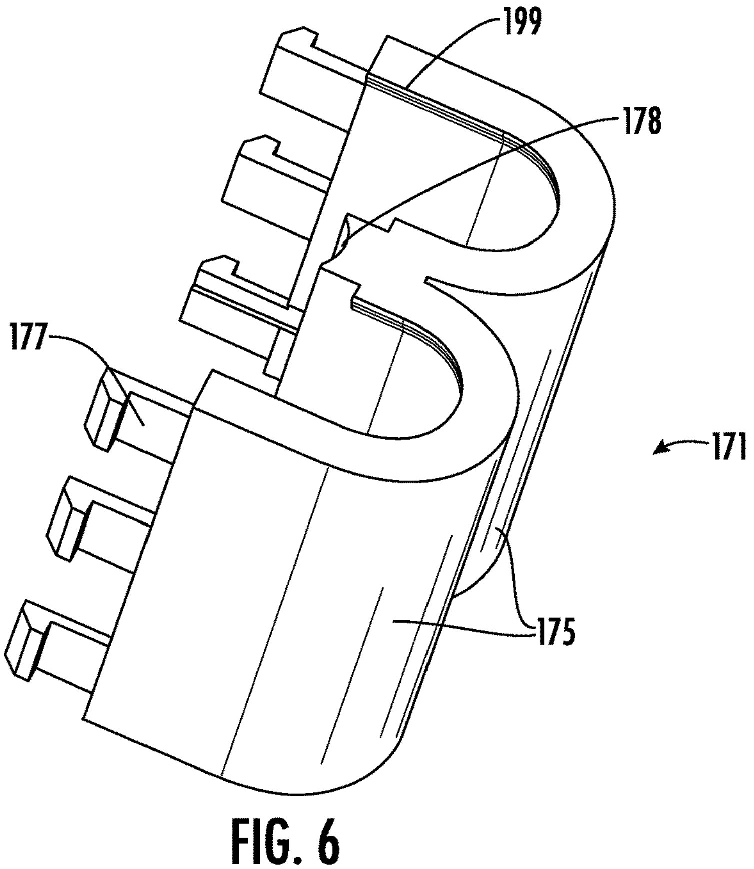
FIG. 6 is an opposed perspective view of the cover piece of FIG. 5.

Referring now to FIGS. 5 and 6, the cover piece 171 includes two adjacent arced sections 175 that meet at a wall 176. At their free ends, the arced sections 175 include latches 177. The inner surface of the wall 176 includes a curved surface 178, and a cutout 179 is present below the curved surface 178 to form a shoulder **178*a*. Ridges 199 extend radially inwardly from the upper edges of the arced sections 175**.

Figure 7:
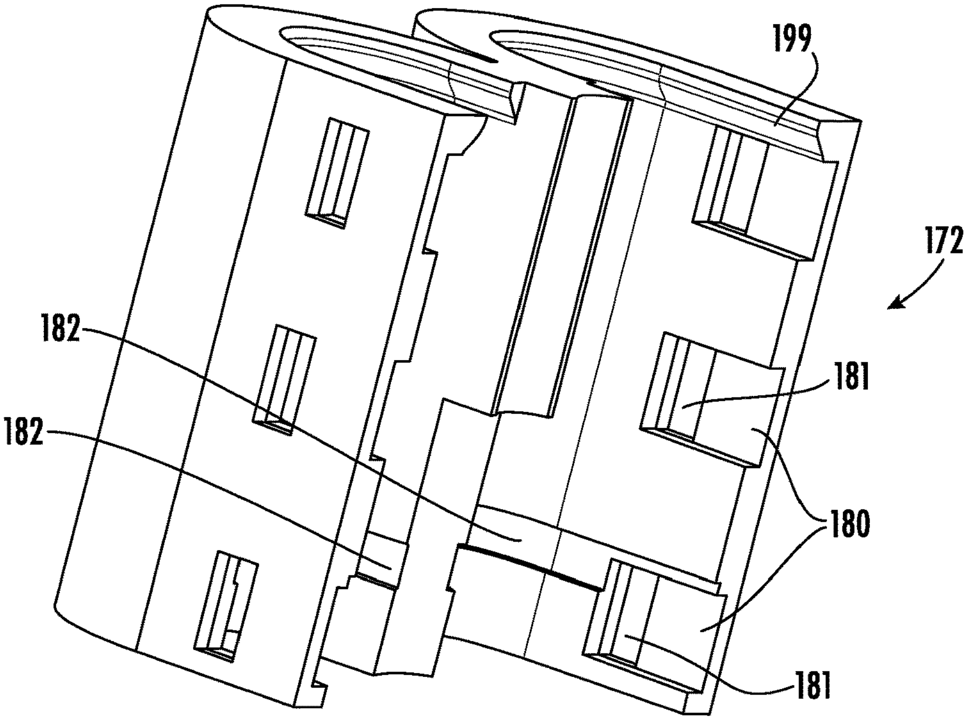
FIG. 7 is a perspective view of a mating cover piece to that of FIG. 5.

Referring now to FIG. 7, the cover piece 172 is similar to the cover piece 171, with the exception that it lacks the latches 177; instead, the cover piece 172 has recesses 180 positioned to receive the latches 177, and further includes slots 181 that receive the hooks of the latches 177. Also, FIG. 7 shows that each of the arced sections 175 of the cover piece 172 have recesses 182 that extend over much of the inner surface of the arced sections 175 near their lower ends (such recesses are also present in the cover piece 171 and are visible in FIG. 5).

Figure 3:
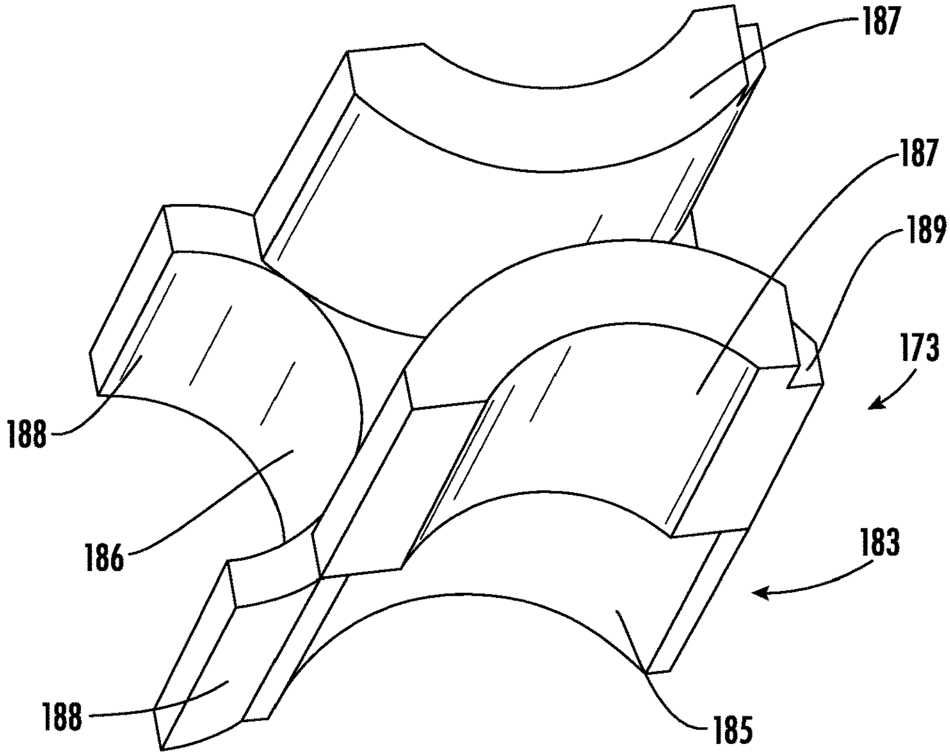
FIG. 3 is a perspective view of a brace of the strain relief boot of the assembly of FIG. 1.
Figure 4:
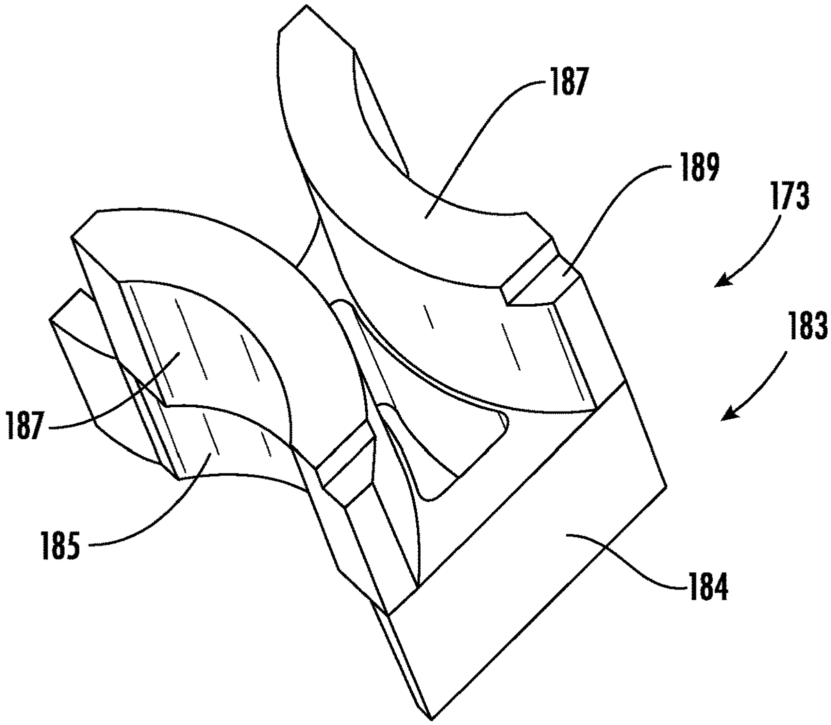
FIG. 4 is an opposed perspective view of the brace of FIG. 3.

Referring now to FIGS. 3 and 4, each of the braces 173, 174 (which in the illustrated embodiment are identical) has a four-sided base 183, wherein one of the sides has a flat wall 184, two of the sides have opposed concave walls 185, and the fourth side opposed to the flat wall 184 has a concave wall 186 that also includes wings 188. Each brace 173, 174 also includes a concave capture section 187 that extends from a respective one of the concave walls 185; each of the capture sections 187 is offset radially outwardly from its underlying concave wall 185. Each capture section 187 includes a cutout 189 on its side edge above the flat wall 184.

Figure 8:
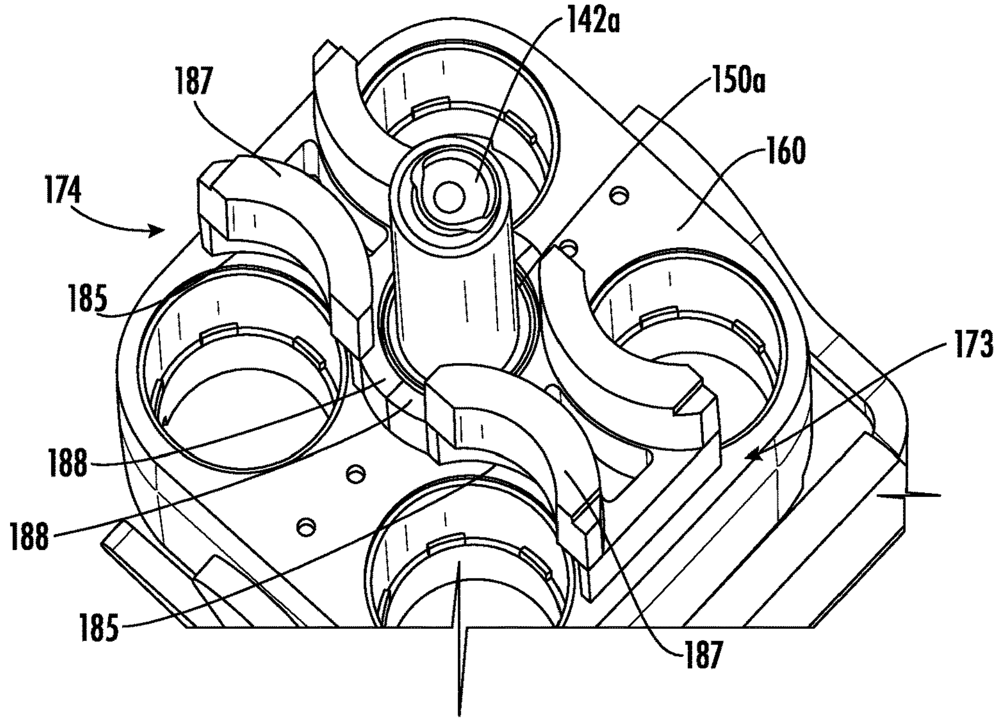
FIG. 8 is a top perspective view of the shell, one central cable and connector, and two braces of FIG. 3 in position around the cable and connector.
Figure 9:
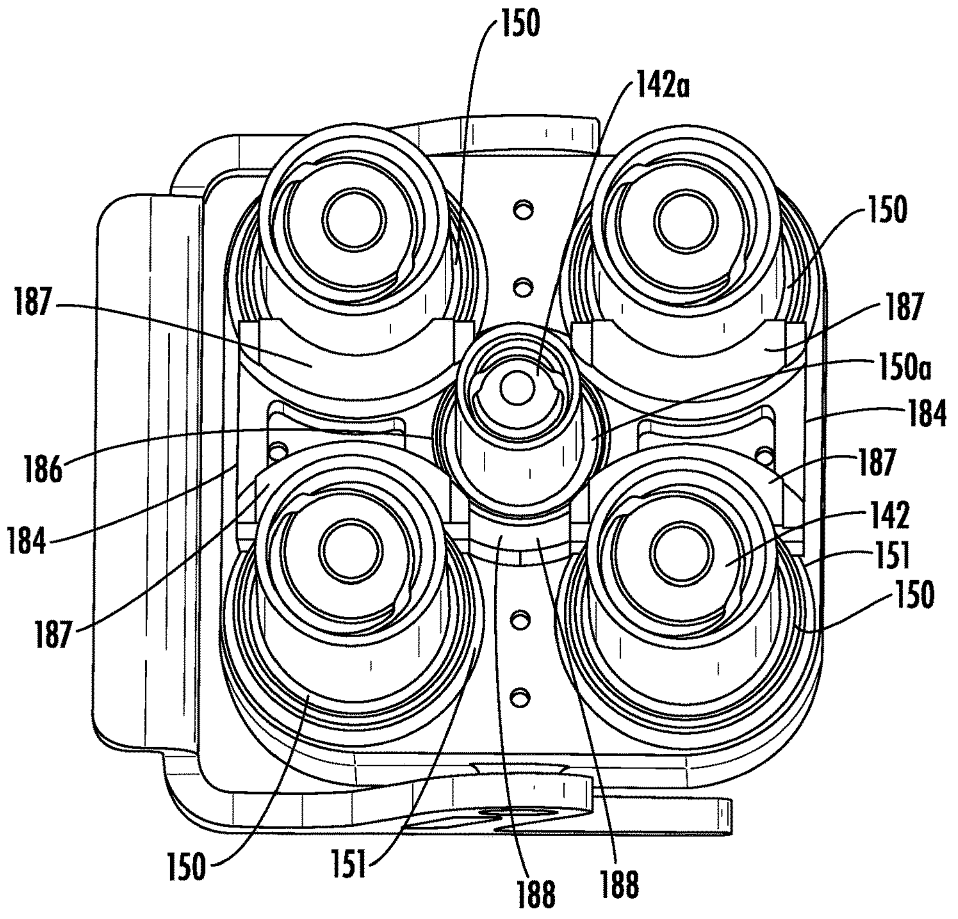
FIG. 9 is a top perspective view of the shell and braces of FIG. 8 with all five cables and connectors included.
Figure 10:
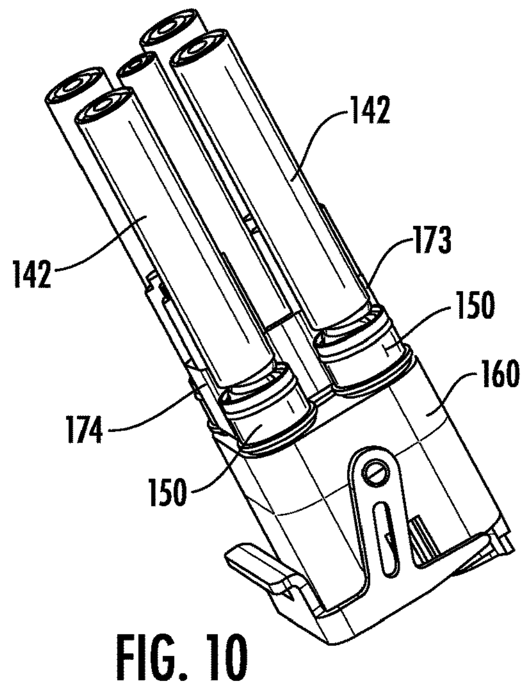
FIG. 10 is a perspective view of the assembly of FIG. 1 with the cover removed.
Figure 11:
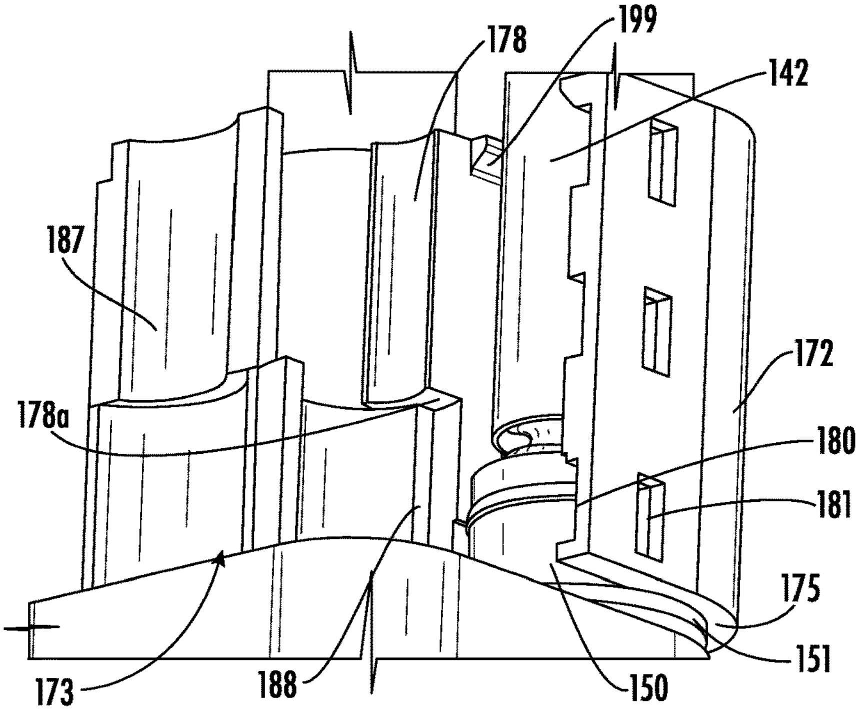
FIG. 11 is an enlarged partial perspective view of the assembly of FIG. 1 illustrating the engagement of one of the cover pieces with one of the braces.
Figure 12:
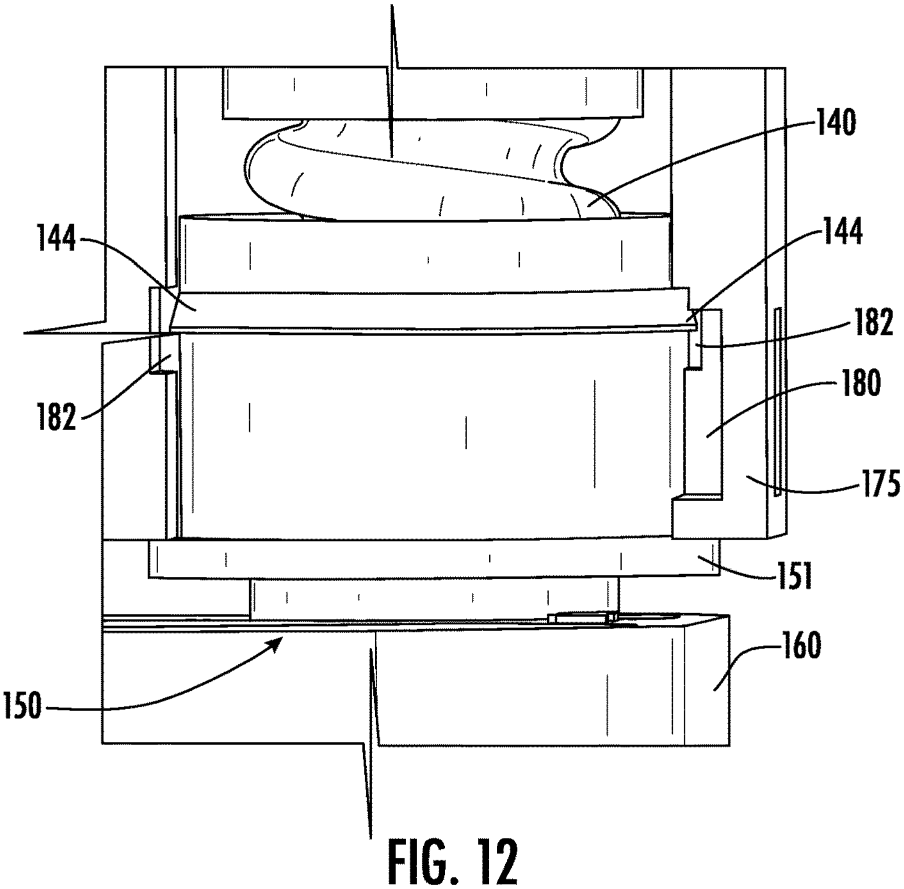
FIG. 12 is an enlarged internal view of a connector and one portion of a cover piece illustrating how the projection of the connector body is received in the recess of the cover piece.

As can be envisioned from FIGS. 2 and 8-12, the strain relief boot 170 is assembled on the cables 142, **142*a*, connectors 150, 150*a* and shell 160 such that the braces 173, 174 are positioned on opposite sides of the central cable 142*a*, and the cover pieces 171, 172 come together to be positioned on opposite sides of the cables 142. More specifically, each of the braces 173, 174 is positioned with its concave wall 186 engaging the central cable 142*a* and its concave walls 185 adjacent a respective cable 142. One end of each brace 173, 174 contacts a flange 151 on each of the connectors 150 (see FIG. 9). At its opposite end, the capture sections 187 of each brace 173, 174 engage and capture the jacket of a respective cable 142 (FIG. 9). Each of the wings 188 of the braces 173, 174 confronts a wing 188 of the other brace 174, 173 (FIG. 8**).

Once the braces 173, 174 are in position, the cover pieces 171, 172 are brought together to form an outer shell for the strain relief boot 170. As can be envisioned by reference to FIGS. 1 and 2, the cover pieces 171, 172 are positioned on opposite sides of the cables 142, **142*a* and aligned so that the latches 177 of the cover piece 171 slide into the recesses 180 of the cover piece 172 until the hooks of the latches 177 reach and enter the slots 181. In this position, each of the arced sections 175 of the cover pieces 171, 172 partially surrounds a respective cable 142. The shoulder 178*a* of each cover piece 171, 172 engages the ends of the adjacent wings 188 of the braces 173, 174, thereby maintaining the braces 173, 174 in position (see FIG. 11). Also, a radially-outward projection 144 of each connector 142 is captured within the recesses 182 of the cover pieces 171, 172, which prevents the attached cover pieces 171, 172 from being separated from the connectors 150, 150***a* by sliding movement along the cables 142, 142*a* (see FIG. 12). Further, the ridges 199 of the cover pieces 171, 172 overlie the upper edges of the capture sections 187 of the braces 173, 174 and fit within the cutouts 189, and are also positioned to engage the jackets of the cables 142.

The configuration illustrated and described herein provides a protective structure over the cable/connector interfaces while enabling each of the connectors 150, 150*a* to "float" axially relative to the strain relief boot 170, and to do so independently of the other connectors 150, 150*a*. As can be seen in FIG. 8, the central connector 150*a* is free to float axially relative to the concave walls 185 and wings 188. The remaining connectors 150 are free to float axially relative to the cover pieces 171, 172 and braces 173, 174 because each projection 144 is free to move axially within the recesses 182 (see FIG. 12). Thus, the cable connector assembly 140 can permit axial float for each of the connectors 150, 150*a* (which are already configured to float axially relative to the shell 160) while still providing its protective function.

In addition, the strain relief boot 170 is configured such that the stress experienced in one of the cables 142, 142*a* due to movement of one of the connectors 150, 150*a* relative to the shell 160 is absorbed by the adjacent cables 142, 142*a* (as opposed to either the shell 160 or the individual port connector bodies, as in a typical cable strain relief). It may be impractical, costly and complex to attach combine the strain relief and the shell 160, passing the strain to the individual port connector bodies may result in an unstable interface.

The cover pieces 171, 172 and braces 173, 174 may be formed of a number of suitable materials. In some embodiments, these components comprise a relatively rigid polymeric material, such as glass-filled Nylon 6,6.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A ganged connector assembly, comprising:
first, second, third and fourth coaxial cables;
first, second, third and fourth coaxial connectors, each of the coaxial connectors connected with a corresponding one of the coaxial cables;
a shell surrounding the coaxial connectors, the shell configured to electrically isolate each of the coaxial connectors from the other coaxial connectors, wherein the coaxial connectors are arranged in a generally square pattern; and
a strain relief boot comprising a cover disposed around portions of the coaxial cables and the coaxial connectors, the cover engaging each of the coaxial connectors;
wherein each of the coaxial connectors includes a radial projection, wherein the cover includes a recess in an inner surface thereof that receives a respective one of each of the coaxial connectors, and wherein the projections and recesses are configured to permit limited relative axial movement between each of the coaxial connectors and the cover.

2. The assembly defined in claim 1, wherein the cover comprises first and second cover pieces that are assembled to create the cover, the first cover piece engaging the first and third coaxial cables, and the second cover piece engaging the second and fourth coaxial cables.

3. The assembly defined in claim 2, wherein the strain relief boot further comprises first and second braces that reside within the cover, the first braces positioned between and engaging the first and second of the coaxial cables, and the second brace being positioned between and engaging third and fourth of the coaxial cables.

4. The assembly defined in claim 3, wherein each of the first and second braces includes two capture sections, wherein the capture sections of the first brace engage the first and second coaxial cables, and the capture sections of the second brace engage the third and fourth coaxial cables.

5. The assembly defined in claim 4, wherein each of the first and second cover pieces includes a ridge, and wherein each of the ridges engages one of the capture sections of each of the first and second braces.

6. The assembly defined in claim 3, wherein each of the first and second braces includes two wings, and wherein the first and second cover pieces engage one of the wings of each of the first and second braces.

7. The assembly defined in claim 2, wherein the first cover piece has first assembly features, and the second cover piece has second assembly features that complement the first assembly features to maintain the first and second cover pieces as a cover.

8. A ganged connector assembly, comprising:
first, second, third, fourth and fifth coaxial cables;
first, second, third, fourth and fifth coaxial connectors, each of the coaxial connectors connected with a respective coaxial cable;
a shell surrounding the coaxial connectors, the shell configured to electrically isolate each of the coaxial connectors from the other coaxial connectors, wherein the coaxial connectors are arranged in a generally cruciform pattern, wherein the fifth coaxial connector is positioned in the center of the pattern; and
a strain relief boot comprising a cover disposed around portions of the coaxial cables and the coaxial connectors, the cover engaging each of the coaxial connectors;
wherein each of the coaxial connectors includes a radial projection, wherein the cover includes a recess in an inner surface thereof that receives a respective one of each of the coaxial connectors, and wherein the projections and recesses are configured to permit limited relative axial movement between each of the coaxial connectors and the cover.

9. The assembly defined in claim 8, wherein the cover comprises first and second cover pieces that are assembled to create the cover, the first cover piece engaging the first, third and fifth coaxial cables, and the second cover piece engaging the second, fourth and fifth coaxial cables.

10. The assembly defined in claim 9, wherein the cover further comprises first and second braces that reside within the cover, the first brace being positioned adjacent the fifth coaxial cable and between the first and second coaxial cables and engaging each of the first, second and fifth coaxial cables, and the second brace being positioned adjacent the fifth coaxial cable opposite the first brace and between the third and fourth coaxial cables.

11. The assembly defined in claim 10, wherein each of the first and second braces includes two capture sections, wherein the capture sections of the first brace engage the first and second coaxial cables, and the capture sections of the second brace engage the third and fourth coaxial cables.

12. The assembly defined in claim 11, wherein each of the first and second cover pieces includes a ridge, and wherein each of the ridges engages one of the capture sections of each of the first and second braces.

13. The assembly defined in claim 10, wherein each of the first and second braces includes two wings, and wherein the first and second cover pieces engage one of the wings of each of the first and second braces.

14. The assembly defined in claim 8, wherein the first cover piece has first assembly features, and the second cover piece has second assembly features that complement the first assembly features to maintain the first and second cover pieces as a shell.

15. The assembly defined in claim 8, wherein the fifth coaxial cable is of a smaller diameter than the first second, third and fourth coaxial connectors, and wherein the fifth coaxial cable is connected with the fifth coaxial connector.

* * * * *